(12) United States Patent
Piestun et al.

(10) Patent No.: US 12,440,379 B2
(45) Date of Patent: Oct. 14, 2025

(54) SYSTEMS AND METHODS TO PROBE OCULAR STRUCTURES

(71) Applicants: The Regents of the University of Colorado, a body corporate, Denver, CO (US); Sorbonne Université, Paris (FR)

(72) Inventors: Rafael Piestun, Boulder, CO (US); Kristina Irsch, Paris (FR)

(73) Assignees: The Regents of the University of Colorado, a body corporate, Denver, CO (US); Sorbonne Université, Paris (FR)

( * ) Notice: Subject to any disclaimer, the term of this patent is extended or adjusted under 35 U.S.C. 154(b) by 327 days.

(21) Appl. No.: 17/774,729

(22) PCT Filed: Nov. 5, 2020

(86) PCT No.: PCT/US2020/059161
§ 371 (c)(1),
(2) Date: May 5, 2022

(87) PCT Pub. No.: WO2021/092211
PCT Pub. Date: May 14, 2021

(65) Prior Publication Data
US 2022/0395394 A1 Dec. 15, 2022

Related U.S. Application Data

(60) Provisional application No. 62/930,816, filed on Nov. 5, 2019.

(51) Int. Cl.
*A61F 9/008* (2006.01)
*A61B 3/10* (2006.01)

(52) U.S. Cl.
CPC .............. *A61F 9/008* (2013.01); *A61B 3/102* (2013.01); *A61F 2009/00846* (2013.01)

(58) Field of Classification Search
CPC .......... A61F 9/008; A61F 2009/00846; A61B 3/102; A61B 3/032; A61B 3/1025
See application file for complete search history.

(56) References Cited

U.S. PATENT DOCUMENTS 5,451,785 A 9/1995 Faris
8,983,233 B2 3/2015 Katz et al.
(Continued)

FOREIGN PATENT DOCUMENTS

EP 2865323 A1 4/2015

OTHER PUBLICATIONS

European Patent Application No. 20884258.3, Extended European Search Report, 7 pages, Oct. 18, 2023.
(Continued)

*Primary Examiner* — Tarifur R Chowdhury
*Assistant Examiner* — Carlos Perez-Guzman

(57) ABSTRACT

Systems, methods and software for scanning an ocular structure of an eye are provided. A method includes projecting a light onto the ocular structure, and scanning, by natural movements of the living eye, the light in a region of the living eye. Applicable ocular structures can include an ocular surface, a cornea, a sclera, an iris, a crystalline lens, an ocular fundus, a retina, a choroid, and a vitreous humor. A system includes a light source to create light, and optics to focus the light from the light source onto the ocular structure and to collect secondary light coming from the eye towards a detector. The system also includes a tracking system to register positions of the eye at different times, and a computer system to receive signals coupled from the (Continued)

tracking system representative of eye positions at different times and associate the signals with the tracking position.

23 Claims, 5 Drawing Sheets

(56) References Cited

U.S. PATENT DOCUMENTS

| | | | |
|---|---|---|---|
| 2005/0159662 A1* | 7/2005 | Imanishi | A61B 3/10 |
| | | | 600/473 |
| 2009/0275929 A1 | 11/2009 | Zickler | |
| 2014/0211157 A1 | 7/2014 | Nakahara et al. | |
| 2014/0294245 A1 | 10/2014 | Siilats | |
| 2015/0294147 A1 | 10/2015 | Wisweh | |
| 2016/0062459 A1 | 3/2016 | Publicover et al. | |
| 2016/0338589 A1 | 11/2016 | Carrasco-Zevallos et al. | |
| 2017/0000327 A1 | 1/2017 | Fingler et al. | |
| 2019/0059723 A1* | 2/2019 | Ono | A61B 3/102 |
| 2019/0282088 A1* | 9/2019 | Mohanty | A61B 3/102 |
| 2020/0320707 A1* | 10/2020 | Ross | G06T 7/32 |

OTHER PUBLICATIONS

International Application No. PCT/US2020/059161, International Search Report, Written Opinion, 14 pages, Feb. 8, 2021.

* cited by examiner

SYSTEMS AND METHODS TO PROBE OCULAR STRUCTURES

CROSS-REFERENCE TO RELATED APPLICATIONS

This application is a national stage of International Patent Application No. PCT/US2020/059161 filed Nov. 5, 2020; which claims priority to U.S. Provisional Patent Application No. 62/930,816 filed Nov. 5, 2019, each of which is incorporated by reference herein in its entirety.

TECHNICAL FIELD

Various embodiments of the present technology relate generally to imaging. More specifically, some embodiments of the present technology provide for systems and methods to probe ocular structures.

BACKGROUND

Continuous advances in ophthalmic imaging technologies have led to better understanding of disease mechanisms, design of innovative therapies (e.g., microsurgery, laser, etc.), and characterization of markers of disease progression and treatment efficiency. In particular, in the last two decades, the diagnosis and management of ophthalmic diseases has been transformed by the advent of optical coherence tomography (OCT). Despite these remarkable developments in imaging technologies, including OCT and more recently adaptive-optics retinal imaging as well as their combination, many of the retinal structures critical to vision remain difficult to image in vivo. Hence, new methods are warranted to uncover such structures in the living human eye.

Increasingly, progress is much awaited as the percentage of people with blinding and vision disabling conditions continues to grow. This is mainly the result of an increasing aging population and chronic health conditions resulting in an increase in prevalence of age-related macular degeneration (AMD), vascular diseases (e.g., diabetic retinopathy), long-term complications of glaucoma, and others, which, to date, are only partially treatable or preventable.

Most state-of-the-art ophthalmic instrumentation used in clinics today are based on scanning systems that utilize a stationary fixation point and a source of light that is moved across an ocular area of interest to reconstruct an image. However, our eye is constantly in motion, even during so-called steady fixation, and as such can make in vivo (in particular high-resolution) imaging of the eye challenging and/or induce motion-related artifacts. An inherent advantage of wide-field, full-field, or flood-illumination systems over confocal scanning systems (as used, for example, in scanning laser ophthalmoscopes, OCT devices) is that a single image can be acquired on the order of a few milliseconds and as such is minimally affected by eye motion, providing a non-distorted view of the ocular area of interest. However, reconstruction of images often relies on the acquisition of multiple images obtained with shifted light patterns projected onto the ocular structure or area of interest. Hence, knowledge of the relative eye motion from one frame to another is required for reconstruction of the area of interest.

SUMMARY

A first aspect of the present technology provides a method for scanning an ocular structure of a living eye. The method includes projecting a light onto the ocular structure. The method also includes scanning, by natural movements of the living eye, the light in a region of the living eye.

In a first implementation of the first aspect of the disclosure, the method further includes using a fixation target to select the region of the living eye to be sampled. In a second implementation, the method according to the first aspect, and including in the first implementation thereof, the natural movements of the living eye include in-plane movements. In a third implementation, the method according to the first aspect, and including in the first and/or second implementations thereof, the natural movements of the living eye include in-depth movements. In a fourth implementation, the method according to the first aspect, and including in the first, second and/or third implementations thereof, the ocular structure includes an ocular surface, a cornea, a sclera, an iris, a crystalline lens, an ocular fundus, a retina, a choroid, or a vitreous humor. In a fifth implementation, the method according to the first aspect, and including in any or all of the first through fourth implementations thereof, the light scanned over the ocular structure generates a second light that emanates from the living eye by means of scattering, reflection, absorption, fluorescence, two-photon excitation, or high harmonic generation. In a sixth implementation, the method according to the first aspect, and including in any or all of the first through fifth implementations thereof, the light is generated by a light source that includes a broadband light source, a laser, a light emitting diode, a super-luminescent light emitting diode, a supercontinuum source, or a swept frequency source.

In a seventh implementation of the first aspect of the disclosure, the method according to the first aspect, and including in any or all of the first through sixth implementations thereof, the light being scanned is in a pattern that is or includes: a focus spot, a deterministically structured light, or a speckle pattern light. In an eighth implementation, the method according to the first aspect, and including in any or all of the first through seventh implementations thereof, the method also includes: time gating the light collected from the living eye, and determining depth information. In a ninth implementation, the method according to the first aspect, and including in any or all of the first through eighth implementations thereof, the method further includes spectrally measuring the light collected from the living eye to obtain depth information. In a tenth implementation, the method according to the first aspect, and including in any or all of the first through ninth implementations thereof, the method also includes generating optical coherence tomography A-scans from the light collected from the living eye. In an eleventh implementation, the method according to the first aspect, and including in any or all of the first through tenth implementations thereof, the method further includes reconstructing, using a compressive sensing algorithm, an image of the ocular structure.

A second aspect of the present technology provides a system for scanning an ocular structure of an eye. The system includes a light source to create a light. The system also includes light delivery optics to project the light from the light source onto the ocular structure of the eye. The system further includes light collection optics to collect a secondary light coming from the eye towards a detector or detector array. The system also includes a tracking system to register positions of the eye at different times. The system further includes a computer system communicably coupled to the tracking system to: receive at least one signal encoding data representative of the positions of the eye at different times, and associate the signal obtained from the eye with the tracking position.

In a first implementation of the second aspect of the disclosure, the computer system includes a memory device storing program instructions including an image reconstruction algorithm to facilitate registering, by the tracking system, sampling positions of the eye after the computer system receives the at least one signal. In a second implementation, the system according to the second aspect, and including in the first implementation thereof, the tracking system is implemented a posteriori of receipt, by the computer system, of one or more of: collection of the secondary light by the light collection optics, and receipt of the at least signal by the computer system, and wherein the computer system runs software including an image reconstruction algorithm to facilitate the tracking system registering sampling positions of the eye. In a third implementation, the system according to the second aspect, and including in the first and/or second implementations thereof, the program instructions stored by the memory device further include an optimization process to facilitate registering or otherwise obtaining the positions of the eye at different times. In a fourth implementation, the system according to the second aspect, and including in the first, second and/or third implementations thereof, the positions of the eye at different times are obtained as a result of an optimization process.

In a fifth implementation of the second aspect of the disclosure, the system according to the second aspect, and including in any or all of the first through fourth implementations thereof, the system also includes a fixation target. In a sixth implementation, the system according to the second aspect, and including in any or all of the first through fifth implementations thereof, a region of the ocular structure being sensed is determined by an eye fixation pattern displayed in front of a human or an animal subject. In a seventh implementation, the system according to the second aspect, and including in any or all of the first through sixth implementations thereof, the tracking system includes a predictor to estimate a location of the eye based on prior locations, direction of movement, and speed. In an eighth implementation, the system according to the second aspect, and including in any or all of the first through seventh implementations thereof, the computer system includes a memory device storing program instructions to facilitate implementation of the predictor using one or more of: machine learning, Kalman filtering, and a neural network. In a ninth implementation, the system according to the second aspect, and including in any or all of the first through eighth implementations thereof, the tracking system tracks natural movements of the eye occurring either in-plane or in-depth. In a tenth implementation, the system according to the second aspect, and including in any or all of the first through ninth implementations thereof, the ocular structure imaged includes at least one: the ocular surface, the cornea, the sclera, the iris, the crystalline lens, the ocular fundus, the retina, the choroid, and the vitreous humor.

In an eleventh implementation of the second aspect of the disclosure, the system according to the second aspect, and including in any or all of the first through ninth implementations thereof, the light scanned over the ocular structure generates a second light that emanates from the eye by means of scattering, reflection, absorption, fluorescence, two-photon excitation, or high harmonic generation. In an eleventh implementation, the system according to the second aspect, and including in any or all of the first through tenth implementations thereof, the light source is a broadband light source, a laser, a light emitting diode, a superluminescent light emitting diode, a supercontinuum source, a frequency combs source, or a swept frequency source. In a twelfth implementation, the system according to the second aspect, and including in any or all of the first through eleventh implementations thereof, the light being projected and scanned is or includes: a focus spot, deterministically structured light, or speckle pattern light.

In a thirteenth implementation of the second aspect of the disclosure, the system according to the second aspect, and including in any or all of the first through eleventh implementations thereof, the light collected from the eye is time gated with a reference light to obtain depth information. In a fourteenth implementation, the system according to the second aspect, and including in any or all of the first through thirteenth implementations thereof, the light collected from the eye is spectrally measured with a spectrometer and processed to obtain depth information. In a fifteenth implementation, the system according to the second aspect, and including in any or all of the first through fourteenth implementations thereof, the light collected from the eye is processed to obtain optical coherence tomography A-scans. In a sixteenth implementation, the system according to the second aspect, and including in any or all of the first through fifteenth implementations thereof, an image of the ocular structure is reconstructed using a compressive sensing algorithm by means of the sparse measurements obtained with the scan.

A third aspect of the present technology provides a non-transitory computer-readable medium having program instructions stored thereon which, when executed by one or more processors of a system for scanning an ocular structure of an eye, cause the system to: project a light onto the ocular structure, and scan, by natural movements of the living eye, the light in a region of the living eye.

In a first implementation of the third aspect of the disclosure, when executed by the one or more processors, the program instructions further cause the system to generate the light using a light source. In a second implementation, the non-transitory computer-readable medium according to the third aspect, and including in the first implementation thereof, when executed by the one or more processors, the program instructions further cause the system to project and scan the light in a pattern that is or includes: a focus spot, a deterministically structured light, or a speckle pattern light. In a third implementation, the non-transitory computer-readable medium according to the third aspect, and including in the first and/or second implementations thereof, when executed by the one or more processors, the program instructions further cause the system to: time gate the light collected from the living eye, and determine depth information.

In a fourth implementation of the third aspect of the disclosure, the non-transitory computer-readable medium according to the third aspect, and including in the first, second and/or third implementations thereof, when executed by the one or more processors, the program instructions further cause the system to spectrally measure, using a spectrometer, the light collected from the living eye to obtain depth information. In a fifth implementation, the non-transitory computer-readable medium according to the third aspect, and including in any or all of the first through fourth implementations thereof, when executed by the one or more processors, the program instructions further cause the system to generate optical coherence tomography A-scans from the light collected from the living eye. In a sixth implementation, the non-transitory computer-readable medium according to the third aspect, and including in any or all of the first through fifth implementations thereof, when executed by the one or more processors, the program instructions further cause the system to reconstruct, using a compressive sensing algorithm, an image of the ocular structure.

A fourth aspect of the present technology provides a system. The system includes a light source to create a light. The system also includes light delivery optics to project the light from the light source onto an ocular structure of an eye. The system further includes a detector or detector array. The system also includes light collection optics to collect a secondary light coming from the eye towards the detector or detector array. The system further includes a computer system communicably coupled to the detector or detector array to: receive at least one signal representative of the positions of the eye at different times, and associate the at least one signal with a tracking position during movements of the eye.

BRIEF DESCRIPTION OF THE DRAWINGS

Embodiments of the present technology will be described and explained through the use of the accompanying drawings.

Figure 1:
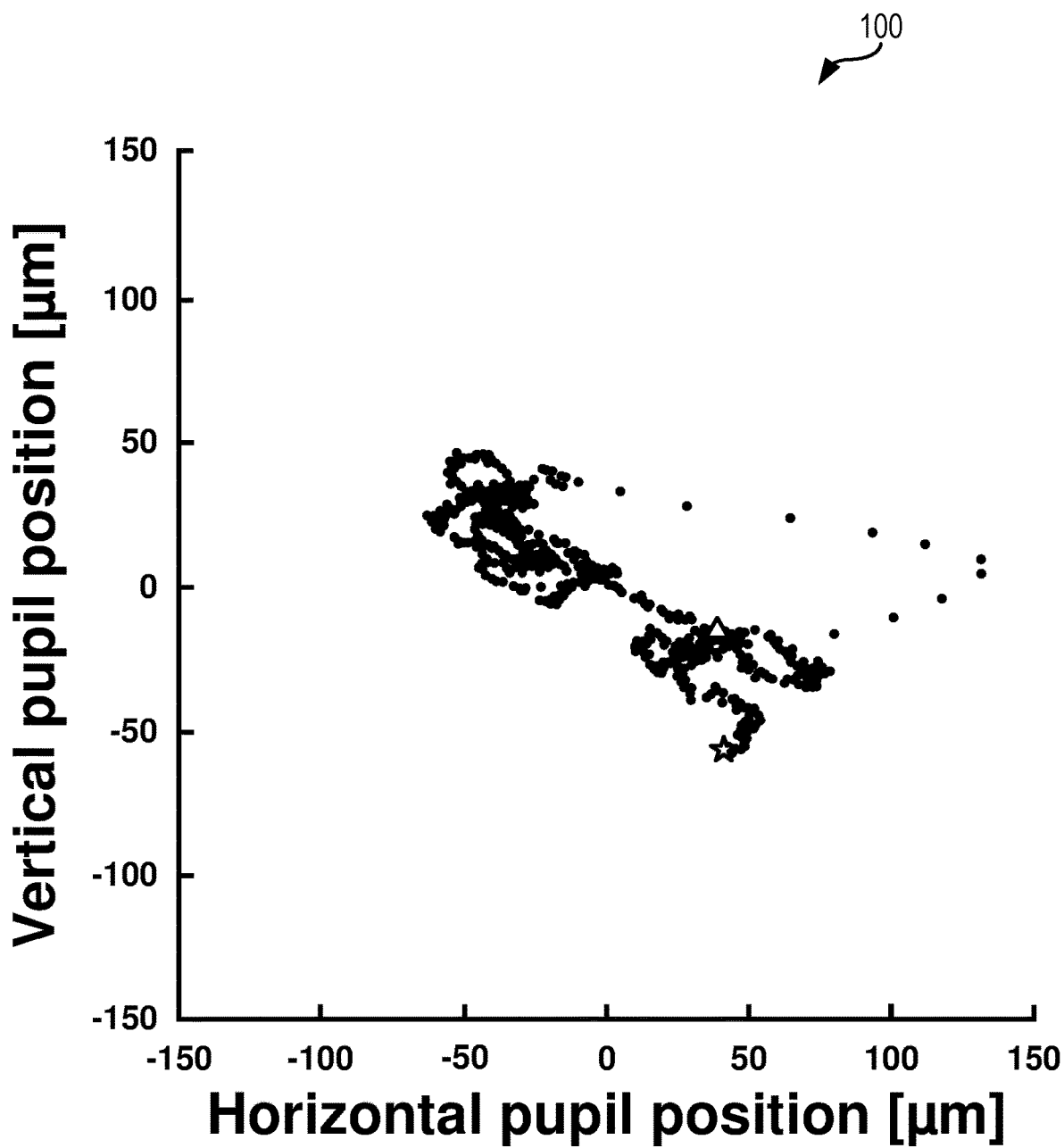
FIG. 1 is a plot showing a typical pupil trajectory during two seconds of "steady" fixation.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology relate generally to imaging. More specifically, some embodiments of the present technology provide for systems (e.g., 200) and methods (e.g., 400) to probe ocular structures 202. Examples of ocular structures 202 include, but are not limited to, an ocular surface, a cornea, a sclera, an iris, a crystalline lens, an ocular fundus, a retina, a choroid, and a vitreous humor.

Various embodiments of the present technology relate to systems (e.g., 200) and methods (e.g., 400) to obtain information via and from the eye 204 by scanning different parts, or regions (e.g., 203) of the eye 204. In accordance with various embodiments, a scanning mechanism utilizes the naturally occurring involuntary movements of the eye 204. The light pattern being projected and scanned can be, or can include, a focus spot, deterministically structured light, or speckle pattern light. The light source 210 being scanned can be coherent, incoherent or partially coherent, broadband or narrowband.

If needed, the scanning data can be registered by precisely tracking the eye movements, so the information collected is reassigned to the specific in-plane and in-depth (ocular) location. Via appropriate choice and positioning of a fixation target, and appropriate choice and positioning of the light delivery as well as detection optics, different ocular structures 202 (e.g., the ocular surface, the cornea, the sclera, the crystalline lens, the ocular fundus, the retina, the choroid, or the vitreous humor) and associated interest areas of the eye 204 can be selected and probed.

For example, in some embodiments, a method 400 for scanning an ocular structure 202 of a living eye 204 can include projecting 402 a light 201 onto the ocular structure 202 of a living eye 204. Examples of the light 201 generated by a light source 210 include, but are not limited to, a broadband light source, a laser, a light emitting diode, a super-luminescent light emitting diode, a supercontinuum source, a swept frequency (color) source, a frequency combs source, and/or others. The method 400 can further include scanning 404, by natural movements of the living eye 204 (e.g., in-plane movements or in-depth movements), the light 201 in a region 203 of the living eye 204. The light 201 being projected and scanned may be in a pattern 208 that is, or includes, a focus spot, a deterministically structured light, or a speckle pattern light. The light 230 collected from the living eye 204 may also be spectrally measured 414 to obtain depth information. The method 400 may also include reconstructing 418, (e.g., using a compressive sensing algorithm) an image 280 of the ocular structure 202.

In some embodiments, along with the proper choice and positioning of light source 210 and delivery optics 220, as well as light detection optics, a fixation target can be used to select the region 203 of the living eye 204 to be sampled. In some embodiments, the light 201 scanned over the ocular structure 202 can generate a second light 230 that emanates from the living eye 204 by means of scattering, reflection, absorption, fluorescence, two-photon excitation, or high harmonic generation. In some embodiments, the method 400 can include time gating 410 the light 410 collected from the living eye 204 and determining 412 depth information. In some embodiments, optical coherence tomography A-scans can be generated 416 from the light 230 collected from the living eye 204.

Some embodiments provide for a system 200 for scanning an ocular structure 204 (e.g., the ocular surface, the cornea, the sclera, the iris, the crystalline lens, the ocular fundus, the retina, the choroid, the vitreous humor, etc.) of an eye 202 that includes a light source 210 to create a light 201. In some embodiments, the light 201 scanned over the ocular structure 202 can generate a second light 230 that emanates from the eye 204 by means of scattering, reflection, absorption, fluorescence, two-photon excitation, or high harmonic generation. The source 210 may be a broadband light source, a laser, a light emitting diode, a super-luminescent light emitting diode, a supercontinuum source, a swept frequency (color) source. The light 201 being projected and scanned may be, or may include, a focus spot, a deterministically structured light, or speckle pattern light.

Light delivery optics 220 can be used in some embodiments to focus the light 201 from the light source 210 onto the ocular structure 202 of the eye 204. Light collection optics 240 can be used to collect a secondary light 230 coming from the eye 204 towards a detector 250 (or detector array). In some embodiments, the light 230 collected from the eye 204 can be spectrally measured with a spectrometer 213 and processed to obtain depth information. The light 230 collected from the eye 204 may be processed in various embodiments to obtain optical coherence tomography A-scans.

A tracking system 270 may be used is some embodiments to register positions of the eye 204 or ocular structure (including the direction of fixation) at different times. The tracking system 270 can include a predictor 218 to estimate a location of the eye 204 based on prior locations, direction of movement, and speed. Predictive data analysis techniques (e.g., machine learning), Kalman filtering, and/or a neural network may be employed for this purpose in some embodiments of the present technology. In some embodiments the tracking system 270 can track natural movements of the eye 204 occurring either in-plane or in-depth. The system 200 may also include a computer system 214, communicably coupled to the tracking system 270, to receive at least one signal 216 encoding data representative of the positions of the eye 204 at different times and associate the signal(s) 216 obtained from the eye 204 with the tracking position. Some embodiments of the system 200 may include a fixation target 222. In some embodiments, a region 203 of the ocular structure 204 being sensed can be determined, or selected, by an eye fixation pattern 222 or target displayed in front of a human or an animal subject. In some embodiments, the light 230 collected from the eye 204 can be time gated with a reference light 211 to obtain depth information. An image 280 of the ocular structure 202 may be reconstructed by a computer system 214 in various embodiments using a compressive sensing algorithm by means of the sparse measurements obtained with the scan.

Various embodiments of the present technology provide for a wide range of technical effects, advantages, and/or improvements to imaging systems and components. For example, various embodiments include one or more of the following technical effects, advantages, and/or improvements: 1) scanning mechanism based on involuntary and naturally occurring eye motion; 2) methods to track in-plane and in-depth location of the eye allowing for image reconstructions; 3) rather than considering involuntary and naturally occurring eye motion a nuisance, various embodiments make use of involuntary and naturally occurring eye motion as a scanning mechanism in itself and as such not only simplifies the setup of most state-of-the-art ophthalmic instrumentation, by eliminating the need for an external scanning system, but also removes motion-related artifacts otherwise occurring from relative movements between a scanned beam and the eye; and/or 4) enablement of proper registration by a tracking system or an eye-tracking subsystem.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable (e.g., non-transitory) medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Scanning Mechanism Based on Involuntary and Naturally Occurring Eye Motion

The eye is constantly in motion. This is because, even during "steady" fixation on a target, as illustrated in FIG. 1, there are involuntary fixational eye movements (e.g., tremors, drifts, and microsaccades). Aside from such planar or in-plane ocular motion, another major source of involuntary eye movements is from vascular pulsation or respiration, manifesting itself in motion in the axial direction. Similarly, spontaneous fluctuations in pupil size and accommodation occur under conditions of constant illumination and fixation. For example, as the eye changes its orientation as it moves, the pupil also changes its shape. Any such involuntary eye motion may be exaggerated in patients.

Various embodiments of the present technology utilize these eye movements as a random or semi-random shift mechanism of the light patterns projected onto the eye. Accordingly, some embodiments perform random or semi-random (but possibly known through measurements) shifts of the light pattern rather than regularly spaced shifts. This enables using the natural involuntary motions of the eye as a shifting mechanism for the illumination, making the system capable of continuous data acquisition and hence providing ever-increasing reconstruction signal to noise ratio (SNR) via redundancy. The random shifts can be determined via measurements through an eye tracking mechanism. For example, some embodiments can use measurement of scleral contact lens/search coils, electro-oculography, photo oculography, or video oculography to sense in-plane (horizontal, vertical, and torsional) motion, and/or the use of optical coherence tomography, or other distance sensing methods, to sense in-depth motion.

Feature- and Image-Based Retinal Motion Measurement

Among these different possible mechanisms for eye motion measurement, such as video-based eye trackers that rely on the measurement of externally visible features of the eye (e.g., the pupil, iris/sclera boundary, iris crypts, and/or corneal light reflections) for the determination of in-plane motion, for instance, the measurement of internal features specific to the structure of interest may be preferable, so that both the eye-tracking sub-system and the imaging system are affected similarly with changes to the eye's optics.

In the case of imaging the ocular fundus, the measurement of internal retinal features (e.g., the Henle fiber pattern delineating the fovea) may be preferred, as not requiring a calibration step to defer retinal motion from external feature extraction. For example, one can measure relative eye motion with a sensing subsystem that images a larger field size of the ocular fundus including the feature- and contrast-rich area of the optic nerve head during the imaging session. This area features, for example, blood vessel bifurcations, the sensing of which (since the earliest implementations), has proven to be reliable and robust, achieving sub-micron resolutions as well as aiding to disambiguate torsional eye rotations that also may occasionally occur involuntarily.

In some embodiments, the eye tracking mechanisms can include a predictor such as a Kalman filtering or a neural network to estimate the location of the eye based on prior locations, direction of movement and speed.

Scanning Mechanism Based on Precise Eye Motion Sensing and Image Registration

One option is to take advantage of the widely used cross-correlation analysis. Another option is to attain a high feature localization precision on the retina or another ocular structure using maximum likelihood localization techniques developed for super-resolution microscopy. The uncertainty in the localization of a feature is much smaller than the feature itself. For instance, the position of a micron-scale object can be determined with nanometer precision. Hence, estimation theory approaches enable optimal estimation of the feature location in the presence of unavoidable noise.

One realization of an eye motion sensing subsystem when imaging the ocular fundus is based on a near-IR flood illumination, provided by a super luminescent diode (SLO) (e.g. at 790 nm), with a wide field of view (FOV), such as a 45° (~13 mm) view of the ocular fundus obtained with a standard 20 D ophthalmic lens (according to ISO 10940: 20098 external-angle FOV specifications), and an integration time of ~5 milliseconds or less to eliminate motion artifacts. The power of the sensing source is carefully adjusted to allow optimization of the power of the imaging source, while still providing ample SNR to achieve the precision required for reliable image registration, in compliance with ocular safety limits established by ISO and ANSI standards (ISO 15004-2:2007 and ANSI ZS0.36-2016 respectively) for simultaneous use of multiple source instruments. An sCMOS camera (e.g., ORCA flash4-V2, Hamamatsu) at >200 Hz with a, e.g., 2048×1024 pixel resolution is appropriate for the task.

Figure 2:
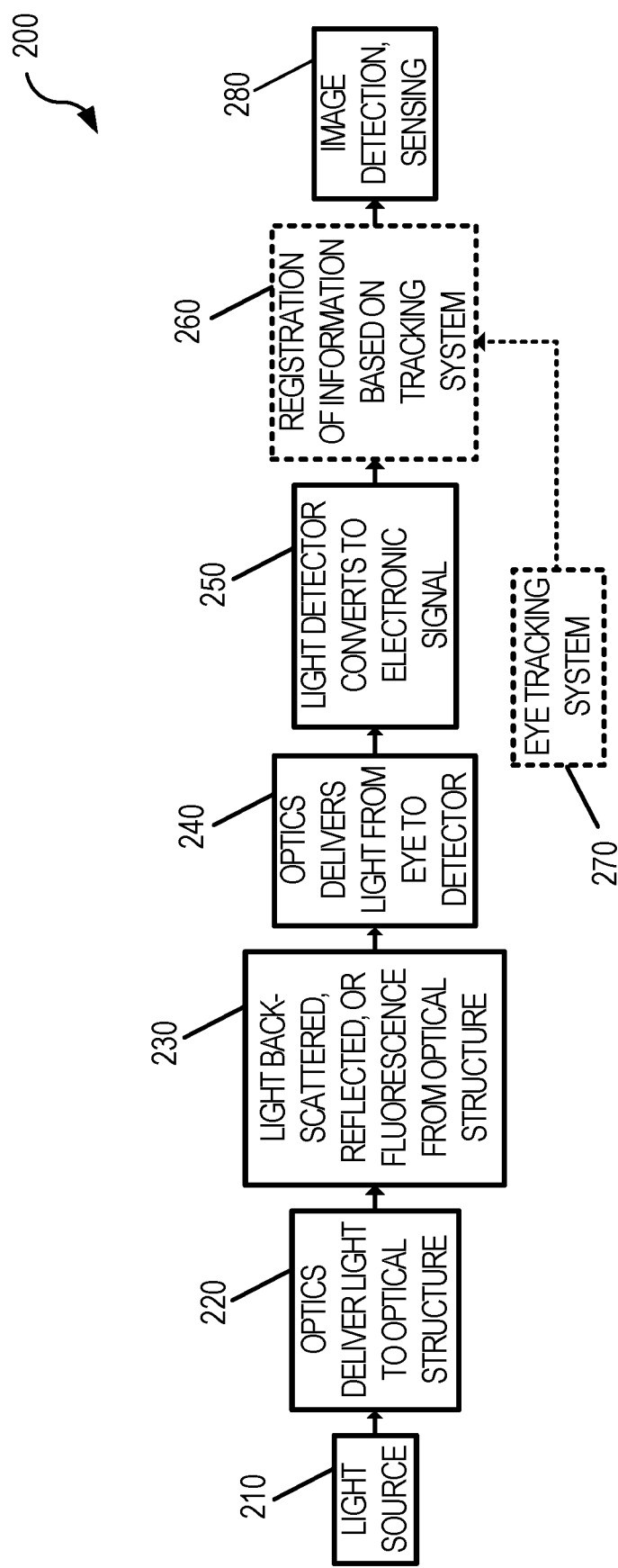
FIG. 2 is a high-level diagram of the scanning method and system that may be used in various embodiments of the present technology.
Figure 3:
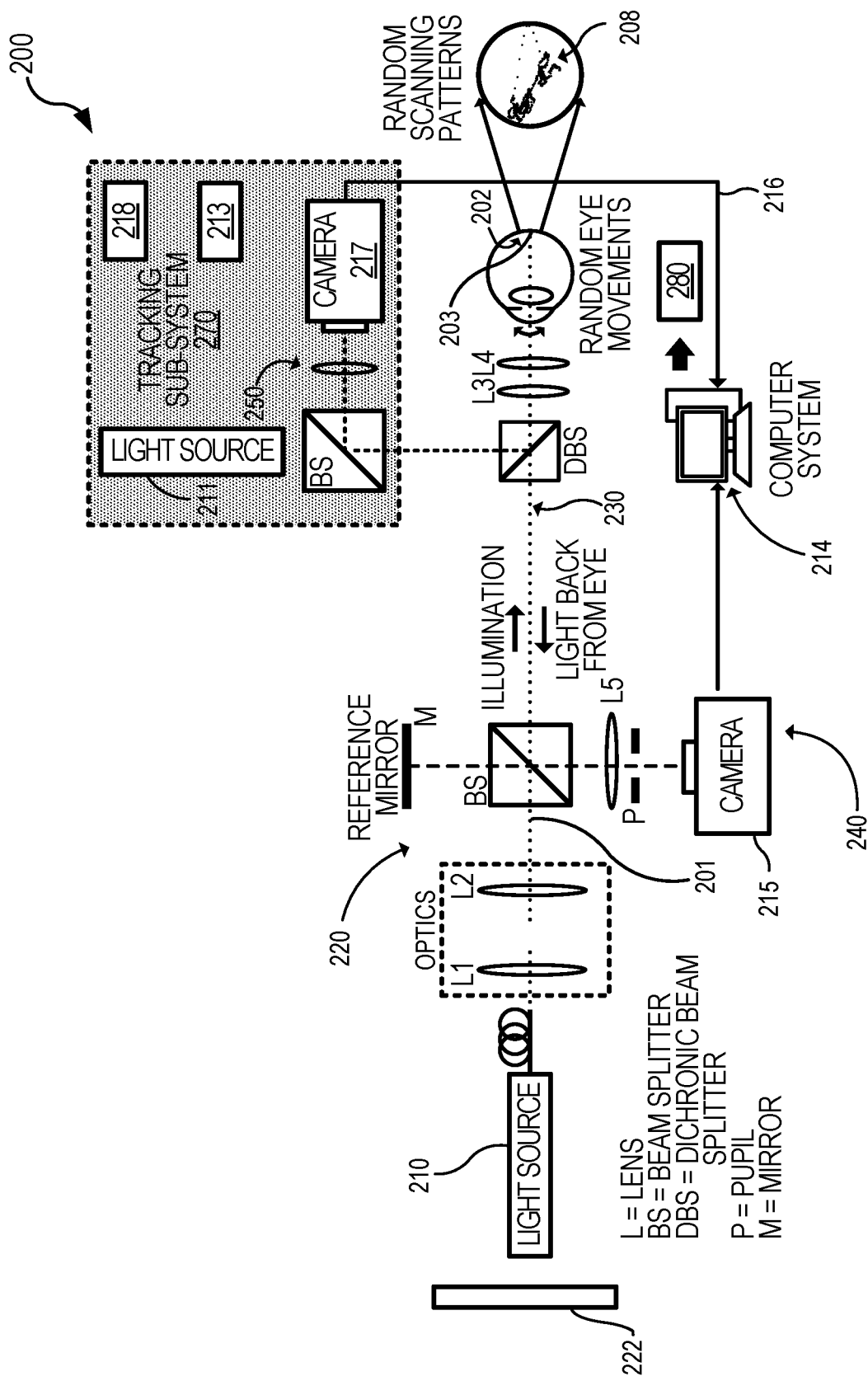
FIG. 3 is a schematic illustrating various components of one possible implementation of the random scanning method and sample implementation of the tracking system (in case of the ocular structure of interest being the ocular fundus).

FIG. 2 illustrates a high-level diagram 200 of the scanning method and system that may be used in some embodiments of the present technology. FIG. 3 depicts one particular realization of the system 200 to image a retina. As illustrated in FIGS. 2 and 3, a light source 210 can deliver optical radiation (e.g., light 201) to the eye 204 by means of optical elements 220 (e.g., lenses, gratings, diffusers, mirrors (spherical or aspheric), and the like). Light 230 from the ocular structure can be backscattered, reflected, or the result of fluorescence from intrinsic or extrinsic substances. Furthermore, light 230 emanating from the eye 204 can be the result of scattering, reflection, absorption, fluorescence, two-photon excitation, or high harmonic generation.

This secondary light 230 propagates back through the eye 204 and is collected by optics 240 such as lenses, gratings, diffusers, and mirrors (spherical or aspheric), before being collected by a detector 250 (e.g., as a photomultiplier tube or Avalanche photodiode (APD), or detector array such as a camera or APD array). Because the eye 204 is constantly moving, even during so-called steady fixation, the light 230 collected corresponds to different parts and hence an area of the ocular structure 202 is scanned over time. This information is registered 260 (e.g., aligned with prior information based on a tracking system 270 that establishes the orientation/position of the eye 204 at every instant. The eye tracking system 270 can be one out of many options for in-plane eye motion sensing mechanisms, such as scleral contact lens/search coils, electro-oculography, photo oculography, and video-based oculography methods and/or in-depth motion sensing mechanisms, relying on the tracking of external or internal ocular features or structures 202. Once part or all of the information is collected, an image 280 can be reconstructed or a feature detected or sensed.

Note that the eye scan system (e.g., system 200) scans in 2D across the ocular structure 202 and in-depth by proper choice and positioning of an eye fixation target (e.g., an accommodative target) in addition to an appropriately chosen and positioned light source 210 and light delivery optics 220 as well as light detection optics 240, targeting a specific ocular structure 202 or layer within the eye 204. For example, by adding a microscope objective lens to a setup designed to probe the retina, it may be turned into one probing the cornea instead. In addition, different patches of the selected ocular structure 202 can be scanned by shifting a fixation target 222 transversely. This in effect becomes a 3D scanning mechanism. For example, when probing the retina, by directing the eye's 204 fixation point of the retina, the fovea, approximately 15 degrees away from the straight ahead gaze, in the nasal direction, the imaging system may be centered on the optic disk rather than on the macula.

The ocular structures 202 that can be sensed by this sampling/scanning mechanism include the cornea, the crystalline eye lens, the iris, the sclera, the vitreous humor, the ocular fundus, the retina, and any other substructure of the eye 204.

Reconstruction

By use of a precise tracking system, the sampling positions over time can be registered to establish a map of the measurements. Because the eye movements might appear almost random, the positions will not necessarily fall on a square grid and interpolation might be required. Furthermore, depending on the acquisition time, the random sampling might or might not be enough to satisfy the Nyquist sampling condition. In these cases, compressive sensing algorithms could be used to fill the missing information by use of prior knowledge about the imaging process or the part of the eye 204 being imaged. In this reconstruction process, typically an optimization process is needed and may include maximum likelihood estimation, L1 norm (or other norm) minimization, Bayesian estimation, etc.

In some implementations, the tracking system 270 may be implemented a posteriori during the reconstruction process. According to this approach, the sampling positions are estimated after all the data is collected and possibly in conjunction with the image reconstruction algorithm. This can be performed via a constrained optimization that provides at least one of the locations of the eye 204, the pattern illumination, and the eye structures 202 imaged.

System Options

FIG. 3 depicts one particular realization of the system 200 to image a retina. The illumination could be a laser light source 210 focused on the retina with a confocal pinhole at the detection or a camera in an Imaging Scanning Microscopy (ISM) modality. Alternatively, the laser illumination could generate a speckle pattern on the retina.

The detection part of the system including, e.g., detection optics 240 and related components, may also include an interferometric arm to detect phase, in the case of coherent backscattering, or for the purpose of time gating when using broadband light (like in time-domain (TD) or spectral-domain (SD) optical coherence microscopy (OCT)). In the case of SD-OCT, if a swept frequency (color) source laser light is used in the illumination (or a spectrometer 213 in the detection) and focused on the specific optical structure, for each point scanned through natural motion, one can obtain a so-called A-scan (in depth structural signal) of the optical structure 202 after processing of the swept source backscattered light 230. As the eye movements help scan the optical structure sampling different regions, a full 3D image 280 can be obtained. The A-scans are arranged using the information from the tracking system. It is important that the swept time of the source be shorter than the typical movements of the eye (~<5 ms).

If the light source is broadband, a dispersive element can be incorporated before detection to create a SD-OCT scanner. In this case, an A-scan is also obtained for each sampled location explored by the natural movements of the eye. Again, measurements have to be performed in a short time compared to the eye movements. A full 3D image of the eye can be obtained after enough locations have been sensed and registered using the parallel tracking mechanism.

The source can thus be a laser, a light emitting diode, a super-luminescent light emitting diode, a supercontinuum source, a swept frequency (color) source, or a frequency comb source.

Figure 4:
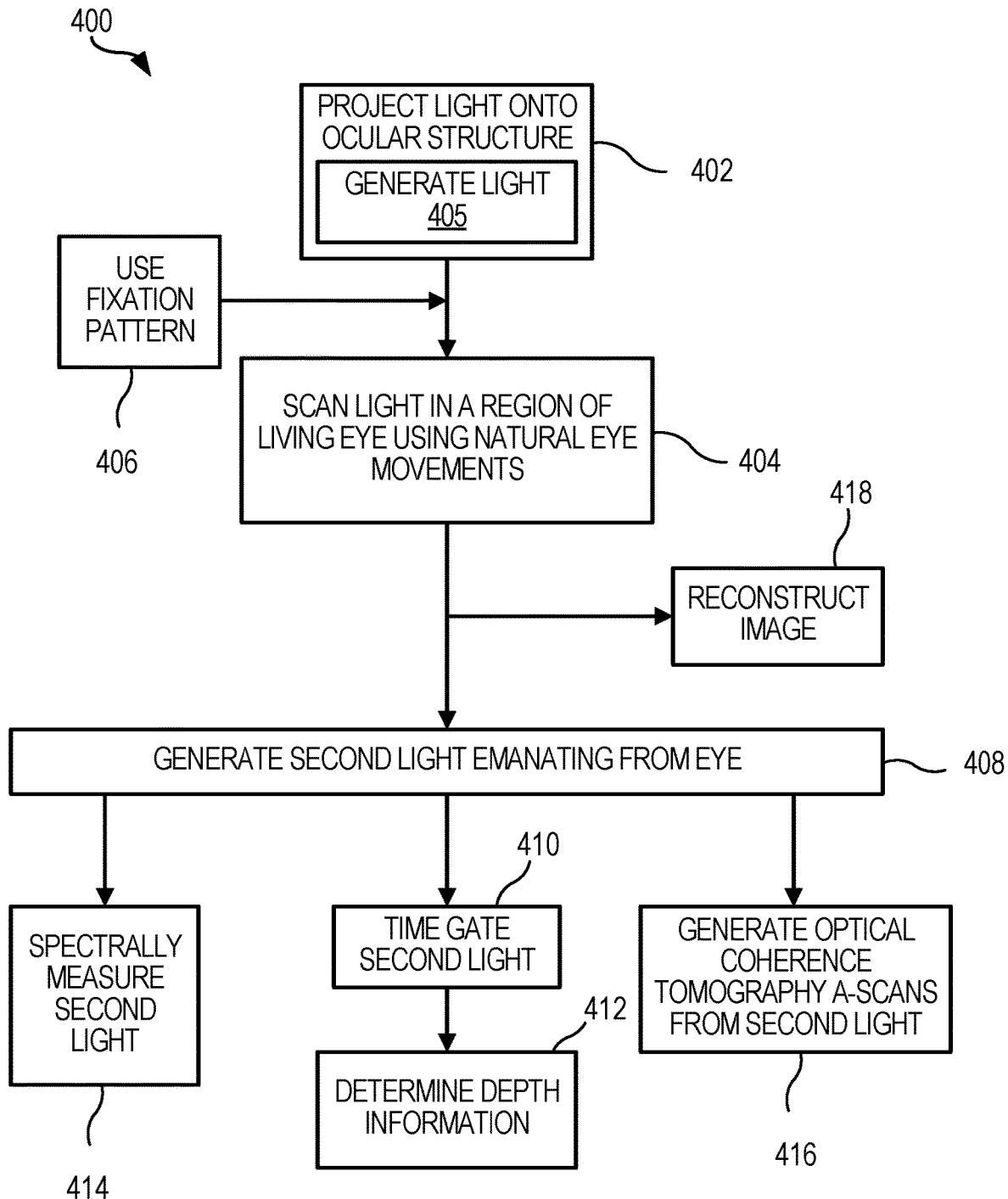
FIG. 4 is a flowchart of a method for scanning an ocular structure of an eye that may be used with the systems shown in FIGS. 2 and 3 according to an embodiment of the present technology.

FIG. 4 is a flowchart of a method 400 for scanning an ocular structure 204 of an eye 202 that may be used with the systems 200 shown in FIGS. 2 and 3 according to an embodiment of the present technology. Method 400 may include the steps of projecting 402 a light 201 onto the ocular structure 202, and scanning 404, by natural movements of the living eye 204, the light 201 in a region 203 of the living eye 204. The natural movements of the living eye 204 in method 400 may include one or both of in-plane movements and in-depth movements. In method 400, the ocular structure 202 may include an ocular surface, a cornea, a sclera, an iris, a crystalline lens, an ocular fundus, a retina, a choroid, or a vitreous humor.

In method 400, the light source 201 may be generated 405 by a light source 210 that includes a broadband light source, a laser, a light emitting diode, a super-luminescent light emitting diode, a supercontinuum source, or a swept frequency source. The light 201 being projected and scanned 404 may be in a pattern 208 that can be, or can include, a focus spot, a deterministically structured light, or a speckle pattern light. Method 400 can also include the step of using 406 a fixation target 222 to select the region 203 of the living eye 204 to be sampled.

In an embodiment, the light 201 scanned 404 over the ocular structure 202 in practice of method 400 can generate 408 a second light 230 that emanates from the living eye 204. Light 230 may emanate from eye 204 by means of scattering, reflection, absorption, fluorescence, two-photon excitation, or high harmonic generation. In an example, method 400 may further include the steps of time gating 410 the light 230 collected from the living eye 204, and determining 412 depth information. In another example, and either instead of or in addition to the time gating 410 and determining steps, method may also include the step of spectrally measuring 414 the light 230 collected from the living eye 204 to obtain depth information.

In other embodiments, the generated 408 light 230 may be used in other useful ways in method 400. In an example, method 400 may further include the step of generating 416 optical coherence tomography A-scans from the light 230 collected from the living eye 204. In embodiment, method 400 may also include the step of reconstructing 418, using a compressive sensing algorithm, an image 280 of the ocular structure 202.

Figure 5:
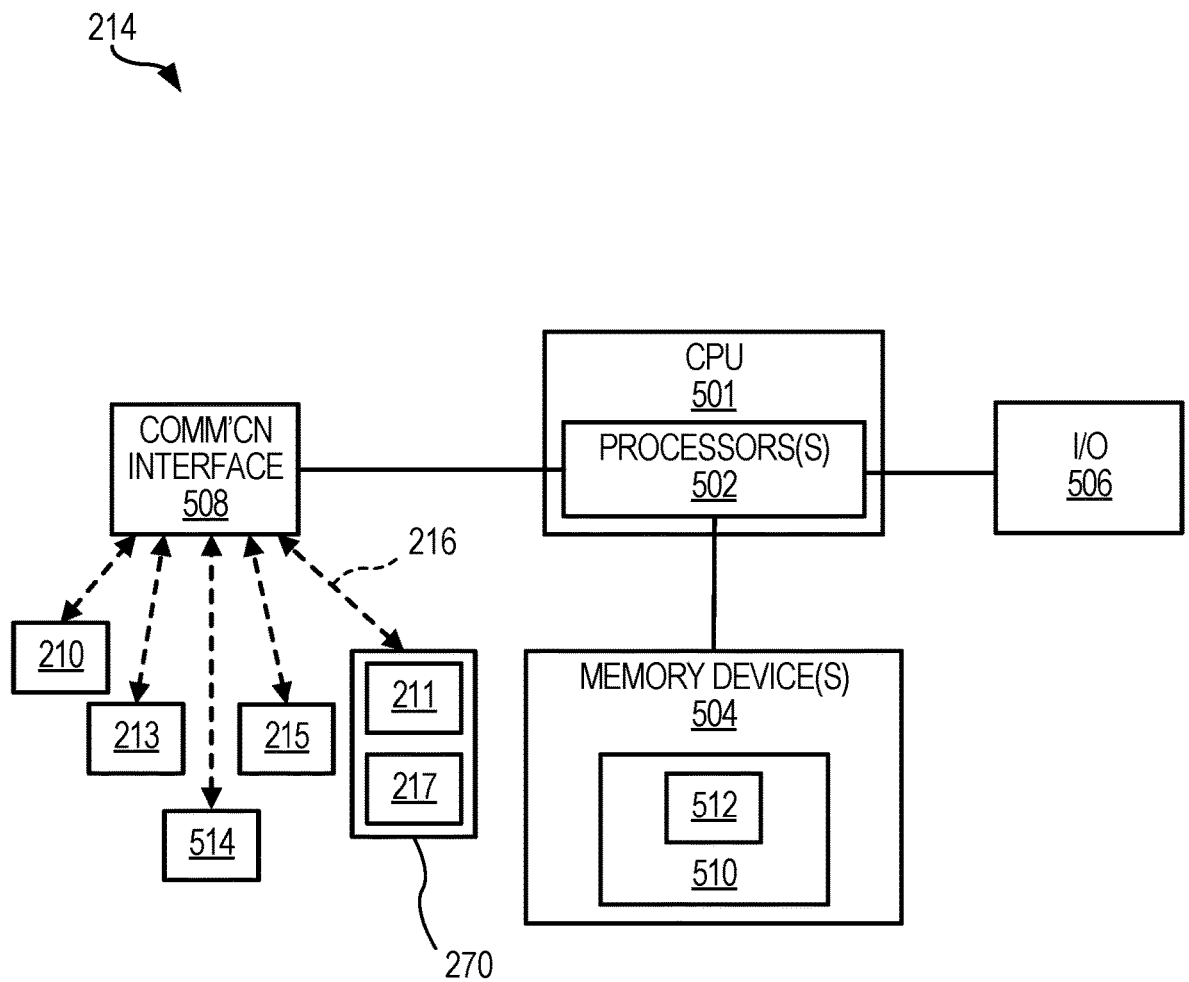
FIG. 5 is a block diagram of the computer system shown in FIG. 3 according to an embodiment of the present technology.

FIG. 5 is a block diagram of the computer system 214 shown in FIG. 3 according to an embodiment of the present technology. Computer system 214 may include a central processing unit (CPU) 501 having one or more processors 502 communicably coupled to one or more memory devices 504. Computer system 214 may also include input/output (I/O) devices 506 such as a display, keyboard, and mouse. A communication interface 508 can be communicably coupled to processor(s) 502 to facilitate, using communication protocols and associated equipment known to persons having ordinary skill in the art, wired and/or wireless communication of encoded data and command signals with various components of system 200. In the illustrated embodiment, communication interface 508 may be communicably coupled to tracking system 270 and a camera 217 and/or other detector 250 components of tracking system 270 to receive signal(s) 216 and to transmit command signals to tracking system 270 and its component parts to implement or otherwise facilitate performance of their operation, for example in method 400.

To similar ends in system 200 and method 400 according to the present technology, communication interface 508 may also be communicably coupled to light source 210 and/or a camera 215 or other detector components included in light collection optics 240. In an example, communication interface 508 may be communicably coupled to a wired (e.g., serial) or wireless (e.g., WiFi) network 514, where at least some of the components of system 200 may be positioned remote from computer system 214 and separated therefrom by some distance. In another embodiment, computer system 214 can be positioned in, or proximate to, the various light generation, optical and imaging components of system 200.

Memory device(s) 504 may include non-transitory computer (e.g., processor 502) readable media 510 for storing program instructions (e.g., encoded as software 512). In an embodiment, when the program instructions are executed by processor(s) 502 of computer system 214, the program instructions cause system 200 to perform one or more of the steps of method 400, as described above with reference to FIG. 4.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology may be recited in a particular claim format (e.g., system claim, method claim, computer-readable medium claim, etc.), other aspects may likewise be embodied in those claim formats, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for probing an ocular structure of a living eye, the method comprising:

projecting a light onto the ocular structure using light delivery optics to generate a secondary light that emanates from the ocular structure, wherein the projection of light is temporally synchronized with detection events occurring at a plurality of successive times, wherein naturally occurring eye movement during these times enables illumination of the ocular structure from distinct perspectives;

detecting, via a detector and light collection optics, the secondary light emanating from the ocular structure at the plurality of successive times, wherein the plurality of successive times correspond to natural positional variations of the ocular structure such that different portions of the ocular structure are illuminated different times;

generating at least one measurement comprising depth information of the ocular structure based on the secondary light detected at the plurality of successive times, wherein the at least one measurement is a composite representation derived from the ocular structure illuminated at the plurality of successive times.

2. The method of claim 1, further comprising using a fixation target to select one or more regions of the living eye to be sampled.

3. The method of claim 1, wherein the natural movements of the living eye include:
transverse movements; or
in-depth movements.

4. The method of claim 1, wherein the secondary light emanates from the living eye by means of scattering, reflection, selective absorption, fluorescence, two-photon excitation, or high harmonic generation.

5. The method of claim 1 further comprising identifying positions of the living eye at the plurality of successive times as the living eye moves naturally.

6. The method of claim 1, further comprising:
time gating the secondary light collected from the living eye; and
determining depth information.

7. The method of claim 1, further comprising spectrally measuring the secondary light collected from the living eye to obtain depth information.

8. The method of claim 1, further comprising generating optical coherence tomography A-scans from the secondary light collected from the living eye.

9. The method of claim 1, further comprising reconstructing, using a compressive sensing algorithm, an image of the ocular structure.

10. A system for probing an ocular structure of a living eye, the system comprising:

light delivery optics configured to project light from a light source onto the ocular structure to generate a secondary light that emanates from the ocular structure, wherein the projection of light is temporally synchronized with detection events occurring at a plurality of successive times such that naturally occurring eye movement during the successive times enables illumination of the ocular structure from distinct perspectives;

a detector;

light collection optics configured to collect secondary light emanating from the ocular structure towards the detector at a the plurality of successive times, wherein the plurality of successive times correspond to natural positional variations of the ocular structure such that different portions of the oculars structure are illuminated at different times; and a computer system communicably coupled to the detector, and configured to:
receive at least one signal from the detector at the plurality of successive times as the living eye moves naturally; and
generate at least one measurement comprising depth information of the ocular structure based on the secondary light detected at the plurality of successive times, wherein the at least one measurement comprises a composite representation derived from the ocular structure illuminated at the plurality of successive times.

11. The system of claim 10, wherein the computer system includes a memory device storing program instructions including an image reconstruction algorithm to identify sampling positions of the living eye after the computer system receives the at least one signal from the detector.

12. The system of claim 10, wherein the computer system is further configured to identify positions of the living eye at the plurality of successive times as the living eye moves naturally.

13. The system of claim 10, configured to recover transverse and depth positions of the natural movements of the living eye.

14. The system of claim 10, wherein the secondary light emanates from the living eye by means of scattering, reflection, selective absorption, fluorescence, two-photon excitation, or high harmonic generation.

15. The system of claim 10, wherein the computer system is further configured to estimate a transverse and depth location of at least one structure of the living eye based on prior locations, direction of movement, and speed.

16. The system of claim 15, wherein the computer system includes a memory device storing program instructions to estimate the positioning of the living eye at the plurality of successive times using one or more of: machine learning, Kalman filtering, and a neural network.

17. The system of claim 10, wherein the light source is a broadband light source, a laser, a light emitting diode, a super-luminescent light emitting diode, a supercontinuum source, a frequency combs source, or a swept frequency source.

18. The system of claim 10, wherein one or both of the light projected by the light delivery optics, and the secondary light collected by the light collection optics, is or includes: a focus spot, deterministically structured light, or speckle pattern light.

19. The system of claim 10, wherein the secondary light collected by the light collection optics from the living eye is time gated with a reference light to obtain depth information.

20. The system of claim 10, wherein the secondary light collected by the light collection optics is spectrally measured with a spectrometer and processed to obtain depth information.

21. The system of claim 10, wherein the secondary light collected by the light collection optics is processed to obtain optical coherence tomography A-scans.

22. The system of claim 10, wherein an image of the ocular structure is reconstructed using a compressive sensing algorithm by means of sparse measurements obtained at the plurality of successive times.

23. A non-transitory computer-readable medium having program instructions stored thereon which, when executed by one or more processors of a system for probing an ocular structure of a living eye, cause the system to:
direct light delivery optics to project a light from a light source onto the ocular structure to generate a secondary light that emanates from the ocular structure, wherein the projection of light is temporally synchronized with detection events occurring at a plurality of successive times such that naturally occurring eye movement during the successive times enables illumination of the ocular structure from distinct perspectives;
direct light collection optics to collect the secondary light emanating from the ocular structure towards a detector at the plurality of successive times, wherein a the plurality of successive times correspond to natural positional variations of the ocular structure such that different portions of the ocular structure are illuminated at different times;
receive, from the detector, at least one signal at the plurality of successive times as the living eye moves naturally; and
generate at least one measurement comprising depth information of the ocular structure based on the secondary light detected at the plurality of successive times, wherein the at least one measurement comprises a composite representation derived from the ocular structure illuminated at the plurality of successive times.

* * * * *